US008657910B2

(12) United States Patent
Park et al.

(10) Patent No.: US 8,657,910 B2
(45) Date of Patent: Feb. 25, 2014

(54) CYCLONE DUST COLLECTOR

(75) Inventors: Hyun Seol Park, Daejeon (KR); Kyoung Soo Lim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 184 days.

(21) Appl. No.: 13/259,765

(22) PCT Filed: Feb. 19, 2010

(86) PCT No.: PCT/KR2010/001048
§ 371 (c)(1),
(2), (4) Date: Sep. 23, 2011

(87) PCT Pub. No.: WO2010/110533
PCT Pub. Date: Sep. 30, 2010

(65) Prior Publication Data

US 2012/0017553 A1 Jan. 26, 2012

(30) Foreign Application Priority Data

Mar. 25, 2009 (KR) ........................ 10-2009-0025599

(51) Int. Cl.
*B01D 51/00* (2006.01)

(52) U.S. Cl.
USPC ................ 55/419; 55/337; 55/459.1; 55/428; 55/429; 55/432; 55/459.4; 55/420; 55/447; 55/448; 55/449; 55/457; 55/456

(58) Field of Classification Search
USPC ................ 55/337, 459.1, 428, 429, 432, 419, 55/459.4, 420, 447–449, 456, 457
See application file for complete search history.

(56) References Cited

U.S. PATENT DOCUMENTS

| | | | | |
|---|---|---|---|---|
| 6,350,292 | B1 | 2/2002 | Lee et al. | |
| 6,502,278 | B2 | 1/2003 | Oh et al. | |
| 6,679,930 | B1 * | 1/2004 | An et al. | 55/337 |
| 7,014,671 | B2 | 3/2006 | Oh | |
| 2001/0054213 | A1 * | 12/2001 | Oh et al. | 15/353 |
| 2004/0231305 | A1 | 11/2004 | Oh | |

FOREIGN PATENT DOCUMENTS

| | | | |
|---|---|---|---|
| JP | 2004-344642 | A | 12/2004 |
| KR | 10-2001-0014570 | A | 2/2001 |
| KR | 10-2002-0000415 | A | 1/2002 |
| KR | 10-0628131 | B1 | 9/2006 |

OTHER PUBLICATIONS

English Language Abstract of JP 2004-344642 A.
English Language Abstract of KR 10-2006-0031443 A which is application publication of KR 10-0628131 B1.
English Language Abstract of KR 10-2001-0014570 A.
English Language Abstract of KR 10-2002-0000415 A.
International Search Report of PCT/KR2010/001048 mailed on Sep. 27, 2010.

* cited by examiner

*Primary Examiner* — Dung H Bui
(74) *Attorney, Agent, or Firm* — Rabin & Berdo, P.C.

(57) ABSTRACT

A cyclone dust collector having a single or multiple dust collection bodies installed within a housing, wherein the dust collection body is composed of an upper primary cylindrical dust collection part and a lower secondary conical duct collection part, and a single or multiple slits are cut in the wall surfaces of the primary and secondary dust collection parts in such a manner that large dust particles with large inertial force are removed between the dust collection housing and the dust collection body via the slit(s), while small dust particles with small inertial force make a swirling flow motion within the dust collection body and are removed by the centrifugal force.

20 Claims, 26 Drawing Sheets

CYCLONE DUST COLLECTOR

TECHNICAL FIELD

The present invention relates to a cyclone dust collector that removes dust particles in dirty gas by separating dust particles from dirty gas using inertial force and centrifugal force.

BACKGROUND ART

A cyclone dust collector is an apparatus that collects and removes fine liquid or solid particles in gas stream. The dust collector uses a principle that, if dust laden gas is applied with acceleration much larger than gravity, a separating velocity of dust particles from gas becomes larger compared to a settling velocity by weight. A structure of conventional cyclone dust collector is shown in FIG. 1. The conventional apparatus provides a structure with: a main body (100) integrated vertically with a storage tank (130) installed at its bottom; a gas inlet (110) formed at one side horizontally along a tangential direction from an outer wall at an upper part of the main body to communicate with the inside of the main body; and an outlet (120) inserted into the upper part of the main body from the top side of the main body to exhaust gas.

The dust collector was initially used to remove dust particles contained in a flue gas of the boiler. Now, the dust collector is used to treat exhaust gases in many industrial fields such as chemical factories, waste incinerators, etc.

Existing methods for removing dust particles from exhaust gas are classified into a mechanical type of gravitation, filtration, inertial impaction, centrifugal devices and scrubber, and an electrical type of applying electric field to dust particles suspended in gas and collecting particles by electrostatic forces. The mechanical type includes wet and dry dust particle collecting methods. The wet method has a high dust collecting efficiency but produces excessive amounts of waste water. Therefore, dry method dust collectors using bag filters or cyclones are mainly used. Further, the electrostatic precipitator having a very high dust collecting efficiency is widely used. The electrostatic precipitator has an excellent merit in dust collecting efficiency as high as 98%. However, the electrostatic precipitator has a limitation in workable temperature of exhaust gas and a demerit of expensive facilities cost. The dust collector using bag filter has 98% dust collecting efficiency but has a problem of limited workable temperature. The cyclone dust collector has a dust collecting efficiency relatively low compared to the other dust collector. Further, when used solely, a pressure loss as much as 50-150 mmAq is relatively low compared to the bag filter apparatus. However, when applied as primary dust collector in front of an electrostatic precipitator collector or bag filters, the whole pressure loss becomes very high and increases the operation cost. Further, if the conventional cyclone is applied to remove abrasive dust particles, the cyclone is easily worn out and its lifespan is decreased. In this case, an inner wall of the cyclone dust collector has to be reinforced with anti-abrasive material causing increase of cost for facilities.

DISCLOSURE

Technical Problem

To solve the above problems of the conventional art, it is therefore an object of the present invention to provide a cyclone dust collector: forming a collector housing encompassing a collector body forming a single slit or a plurality of slits cut on a wall of a primary and a secondary collecting units, thereby removing dust particles having large inertia by flowing on an inner circumferential surface of the collector housing through the slit and removing the dust particles having relatively small inertia by centrifugal force through swirling in a lengthwise direction of the collector body.

Further, it is an object of the present invention to provide a cyclone dust collector: using a plurality of the collecting bodies having relatively smaller inner diameters installed inside of the collector housing, thereby improving an efficiency of the dust collector through increasing a rotational flow velocity of the dirty gas in the collector body due to the smaller diameter.

Further, except for forming an inlet inflowing a dirty gas in a tangential direction of the collector body, it is an object of the present invention to provide a cyclone dust collector: installing a plurality of guide vanes or fans inclined toward an upper inside of the collector body, thereby automatically swirling an axial type stream of the dirty gas that flows in vertically to flow inside the collector body by centrifugal force and inertial force.

As described above, the present invention maintains an excellent dust collecting efficiency while reducing a pressure loss by employing an additional collector body inside the collector housing. A double wall structure with the collector body and the collector housing partially solves a problem of abrasion in the existing cyclone dust collector.

The other objects and the merits of the present invention will be described below and will be understood by an embodiment of the present invention. Further, the objects and the merits of the present invention can be embodied by the means set forth in claims and combination of them.

Technical Solution

The present invention as a means to solve above problem and as a first embodiment of the present invention provides a cyclone dust collector removing dust particles in dirty gas emitted from dust generating sources, the dust collector comprising: a collector body including: a primary dust collecting unit having a certain diameter; and a secondary dust collecting unit extended from a lower end part of the primary dust collecting unit to communicate with the primary dust collecting unit, wherein a diameter of the secondary dust collecting unit is gradually decreasing along a downward direction; an inlet to flow the dirty gas in a direction tangential to the primary dust collecting unit; a collector housing installing the collector body inside thereof to be spaced apart by a certain predetermined gap or to be in contact with the collector housing; an outlet inserted into the upper part of the collector housing and the primary collecting unit by a certain depth to communicate with the collector housing and the primary collecting unit for exhausting the gas removed of dust particles; a rotary valve coupled to the lower end part of the collector housing; and a storage tank coupled to the lower end of the rotary valve to store the dust particles removed in the collector housing.

Further, as a second embodiment of the present invention, a cyclone dust collector removing dust particles in dirty gas emitted from dust generating sources, the dust collector comprising: a collector body including: a primary dust collecting unit having a certain diameter which upper side is open; and a secondary dust collecting unit extended from a lower end part of the primary dust collecting unit to communicate with the primary dust collecting unit, wherein a diameter of the secondary dust collecting unit is gradually decreasing along a downward direction; an inlet forming a plurality of vanes which are installed in equal interval at the upper inside of the primary collecting unit and inclined toward one direction to swirl the dirty gas vertically; a collector housing installing the collector body inside thereof to be spaced apart by a certain predetermined gap or to be in contact with the collector housing; an outlet inserted into the upper part of the collector housing and the primary collecting unit by a certain depth to communicate with the collector housing and the primary collecting unit for exhausting the gas removed of dust particles; a rotary valve coupled to the lower end part of the collector housing; and a storage tank coupled to the lower end of the rotary valve to store the dust particles removed in the collector housing.

Further, as a third embodiment of the present invention, a cyclone dust collector removing dust particles in dirty gas emitted from dust generating sources, the dust collector comprising: a collector housing formed of an upper housing of cylindrical shape having certain diameter and a lower housing of conical shape extended from the lower end of the upper housing to communicate with the upper housing; an inlet to flow the dirty gas in a direction tangential to the upper housing of the collector housing; a collector body including: only a secondary dust collecting unit fixed at a certain height from the lower end of the upper housing of the collector housing to communicate with the upper housing of the collector housing, wherein a diameter of the secondary dust collecting unit is gradually decreasing along a downward direction to maintain a certain gap between the secondary dust collecting unit and the lower housing of the collector housing; an outlet inserted into the upper part of the upper housing of the collector housing by a certain depth to communicate with the upper housing of the collector housing for exhausting the gas removed of dust particles; a rotary valve coupled to the lower end part of the collector housing; and a storage tank coupled to the lower end of the rotary valve to store the dust particles removed in the collector housing.

Further, as a fourth embodiment of the present invention, a cyclone dust collector removing dust particles in dirty gas emitted from dust generating sources, the dust collector comprising: a collector housing formed of an upper housing of cylindrical shape having certain diameter which upper side is open and a lower housing of conical shape extended from the lower end of the upper housing to communicate with the upper housing; an inlet forming a plurality of vanes which are installed in equal interval at the upper inside of the upper housing and inclined toward one direction to swirl the dirty gas vertically; a collector body including: only a secondary dust collecting unit fixed at a certain height from the lower end of the upper housing of the collector housing to communicate with the upper housing of the collector housing, wherein a diameter of the secondary dust collecting unit is gradually decreasing along a downward direction to maintain a certain gap between the secondary dust collecting unit and the lower housing of the collector housing; an outlet inserted into the upper part of the upper housing of the collector housing by a certain depth to communicate with the upper housing of the collector housing for exhausting the gas removed of dust particles; a rotary valve coupled to the lower end part of the collector housing; and a storage tank coupled to the lower end of the rotary valve to store the dust particles removed in the collector housing.

Further, the primary collecting unit forms the first slit unit with a single slit or a plurality of slits on a wall surface thereof cut along a lengthwise direction.

Further, the secondary collecting unit forms the second slit unit with a single slit or a plurality of slits on a wall surface thereof cut along a lengthwise direction.

Further, each of the primary collecting unit and the secondary collecting unit respectively forms the first slit unit formed with a single slit or a plurality of slits and the second slit unit formed with a single slit or a plurality of slits on wall surfaces of the primary collecting unit and the secondary collecting unit cut along lengthwise directions.

Further, the first slit unit and the second slit unit below the first slit unit are cut in a same direction to be aligned with each other and formed an integral slit unit.

Further, the first slit unit and the second slit unit below the first slit unit are cut in different directions not to be aligned with each other.

Further, the collector housing has a cross section selected from one of circular, oval, or polygonal cross sections.

Further, the collector housing comprises an upper housing and a lower housing that encompass the primary collecting unit and the secondary collecting unit, wherein a cross section of the upper housing is different from or identical with a cross section of the lower housing.

Further, the collector housing has a diameter relatively larger than the collector body, wherein the collector housing has a shape identical with or different from a shape of the collector body.

Further, between dust particles flowed into the primary collecting unit or the upper housing of the collector housing through the inlet, the dust particles of large inertial force pass the first slit unit or the second slit unit cut on the wall surface of the collector body, and are removed through a space between the collector body and the collector housing by inertial force, and finally fall into the storage tank; and the particles of relatively small inertial force flow like a vortex in the collector body by centrifugal force and finally fall into the storage tank.

Further, between dust particles flowed into an upper housing of the collector housing through the inlet, the dust particles of large inertial force pass the second slit unit cut on the wall surface of the collector body, and are removed through a space between the collector body and the collector housing by inertial force, and finally fall into the storage tank; and the particles of relatively small inertial force flow like a vortex in the collector body by centrifugal force and finally fall into the storage tank.

Further, the guide vane is replaceable by a rotating fan.

Further, the cyclone dust collector comprises a plurality of the collecting bodies installed inside of the collector housing, wherein a smaller diameter of each of the plural collecting bodies than a diameter the collector body used soley is used thereby improving a dust collecting efficiency through increasing a rotational flow velocity of the dust particles.

Further, the cyclone dust collector employing the plurality of the collecting bodies comprises: a top plenum sealing an upper portion of the housing, wherein, two opposite sides of the top plenum are respectively connected to an inlet duct and an outlet duct to communicate the inlet duct and the outlet duct, and further, the top plenum includes a distributing plate dividing the inside space of the top plenum into an upper part and a lower part and being inclined downward from the inlet duct toward the outlet duct; thereby introducing a dirty gas through the inlet duct connected to one side of the lower part beneth the distributing plate and exhausting the treated gas removed of dust particles through the plurality of the outlets whose upper ends are connected to the distributing plate and then the outlet duct connected to one side of the upper part.

Advantageous Effects

The present invention as described above shows dust collecting efficiency equal to or better than the efficiency of conventional cyclones and has an effect of relatively very low pressure loss. Since a certain amount of inlet flow is devided by and passes through slits and consequently the flow rate swirling inside the collector body is reduced, the friction loss in the collector body due to rotational flow is reduced. That is, a pressure drop of the cyclone can be reduced. The cyclone of the present invention has a dust particle collecting efficiency equal to the conventional cyclone and has effect of reducing pressure loss as much as 10~90% compared to the conventional cyclone. Further, through the double wall structure with the collector body and the collector housing, some of abrasion problem in the conventional cyclone can be solved.

Figure 1:
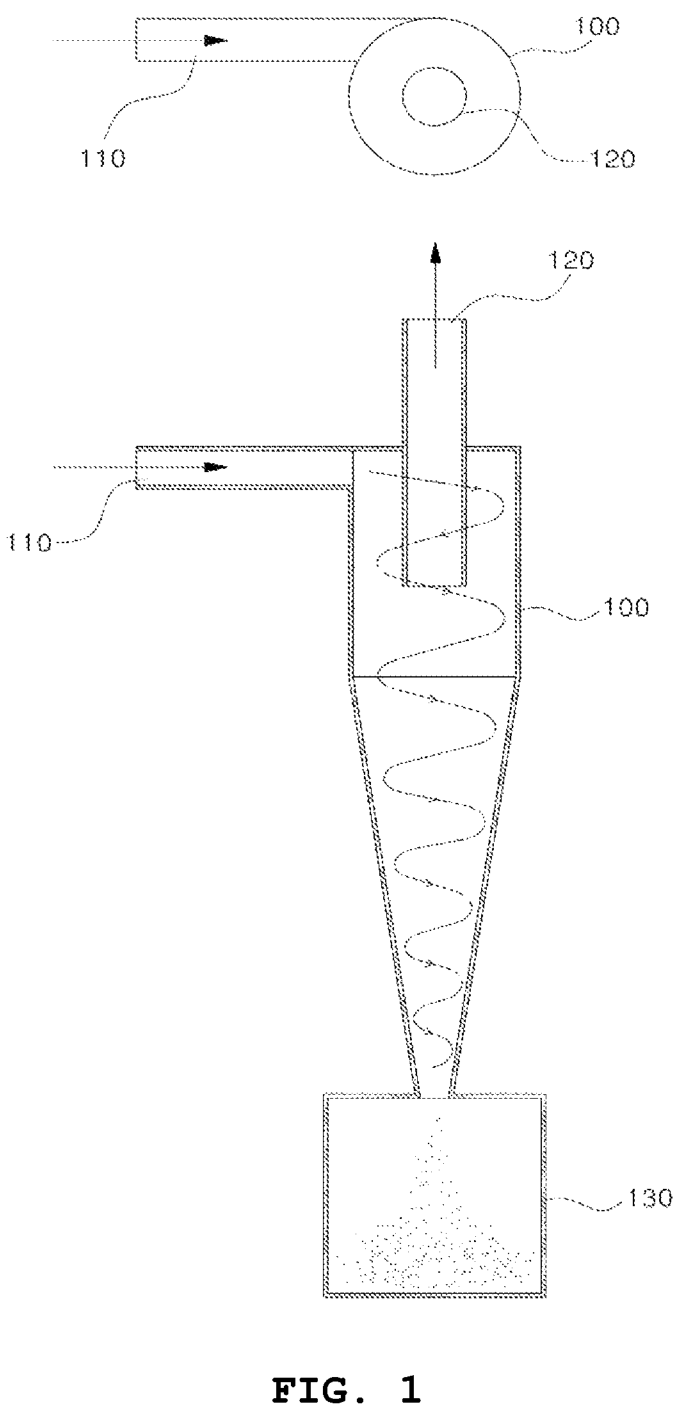
FIG. 1 is a view illustrating a front cross section of a conventional cyclone dust collector.

[Brief description of reference numbers of major elements]

| | |
|---|---|
| 10, 10': collector body | 11: primary collecting unit |
| 12, 12': secondary collecting unit | 13: outlet hole |
| 20, 20': inlet | 21, 22: trajectory |
| 30; collector housing | 40: outlet |
| 50: rotary valve | 51: shaft of rotary valve |
| 52: blade of rotary valve | 60: storage tank |
| 70: slit unit | 71: first slit unit |
| 72: second slit unit | 80: guide vane |
| 90: dust particle generating source | 91: inlet duct |
| 92: outlet duct | 93: fan |
| 94: top plenum | 95: distribution plate |
| 96: coupling hole | |

BEST MODE

Mode for Invention

Before describing several embodiments of the present invention, it will be understood that a detail description of configuration or arrangements of element members recited in the detailed description or illustrated in drawings shall not limit their application. The present invention may be realized by other embodiments and may be performed in various methods. Further, it will be understood that expressions and terms related with direction (for example “front”, “back”, “up” “down”, “top”, “bottom”, “left”, “right” “lateral”, etc.) of the dust collector or elements are used to simplify description for the present invention but not meant to represent that the related apparatus or elements should be directed in certain directions.

The present invention has following features to achieve the said objects.

The present invention will now be described more fully hereinafter with reference to the accompanying drawings. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Accordingly, since an embodiment set forth in the description and a configuration illustrated in drawings is only one of most preferable embodiments of the present invention but does not represent all the technical spirit of the present invention, it shall be understood that many examples of various equivalents and modifications may replace them. Further, terms such as “first” and “second” are used to describe the present application or accompanying claims but not intended to represent or mean relative importance or purpose.

Hereinafter, a cyclone dust collector will be described in detail with reference to the accompanying FIG. 2 through FIG. 26 according to a preferable embodiment of the present invention.

As shown in drawings, the cyclone dust collector according to the present invention comprising: a primary collecting unit (11), a secondary collecting unit (12, 12'), a collector body (10, 10'), the first slit unit (71), the second slit unit (72), a slit unit (70), an inlet (20, 20'), a guide vane (80), a collector housing (30), an outlet (40), a rotary valve (50) and a storage tank (60). In case of removing dust particles emitted in dust generating sources (90) from a dirty gas, the cyclone dust collector of the present invention is a cyclone dust collector improved in dust collection efficiency through: removing dust particles having large inertial force by flowing through the slit cut on the collector body (10, 10') to be escaped along a space between the collector body (10, 10') and the collector housing (30); and removing the dust particles having relatively small inertial force by flowing in rotational way along a lengthwise direction of the collector body (10, 10').

Figure 3:
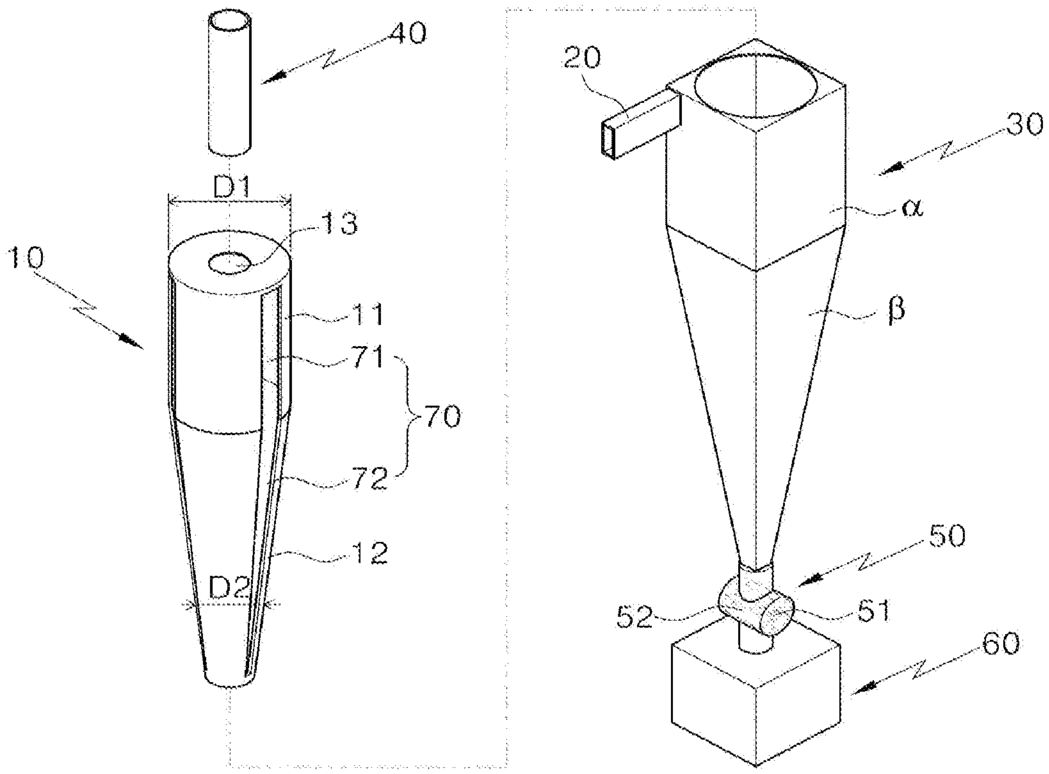
FIG. 3 is a disassembled perspective view of a dust collector according to the first embodiment of the present invention.
Figure 7:
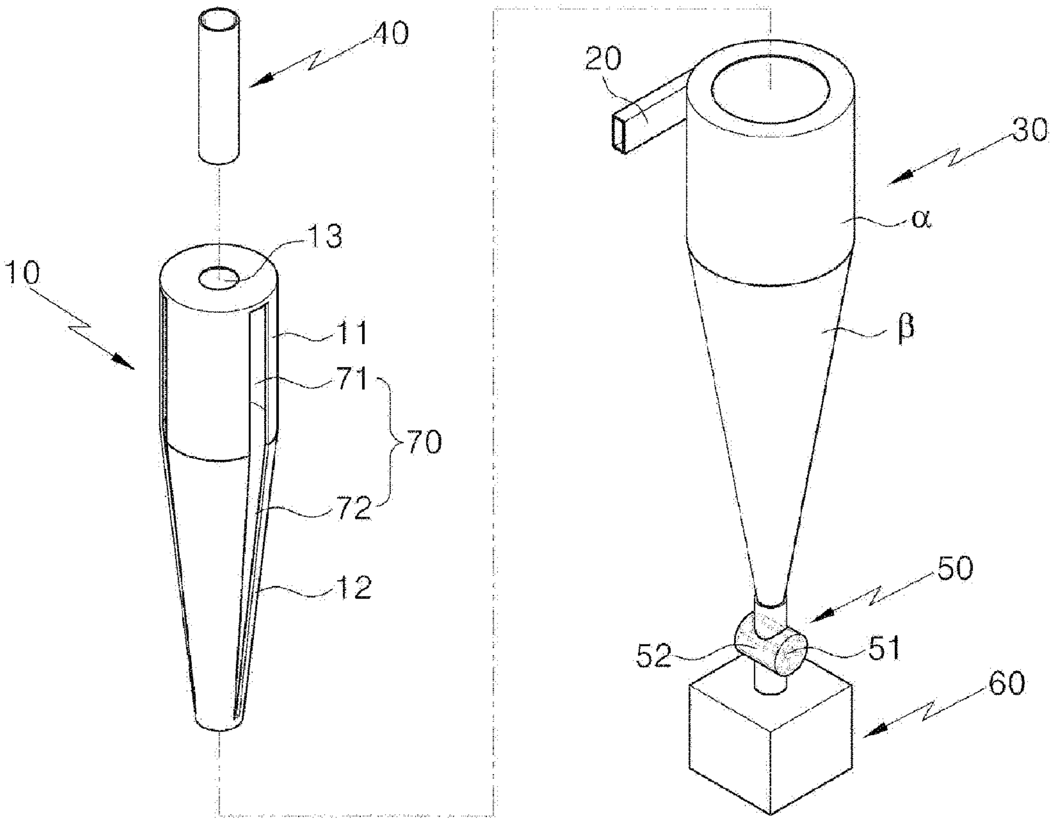
FIG. 7 is a disassembled perspective view of another embodiment of FIG. 3.
Figure 9:
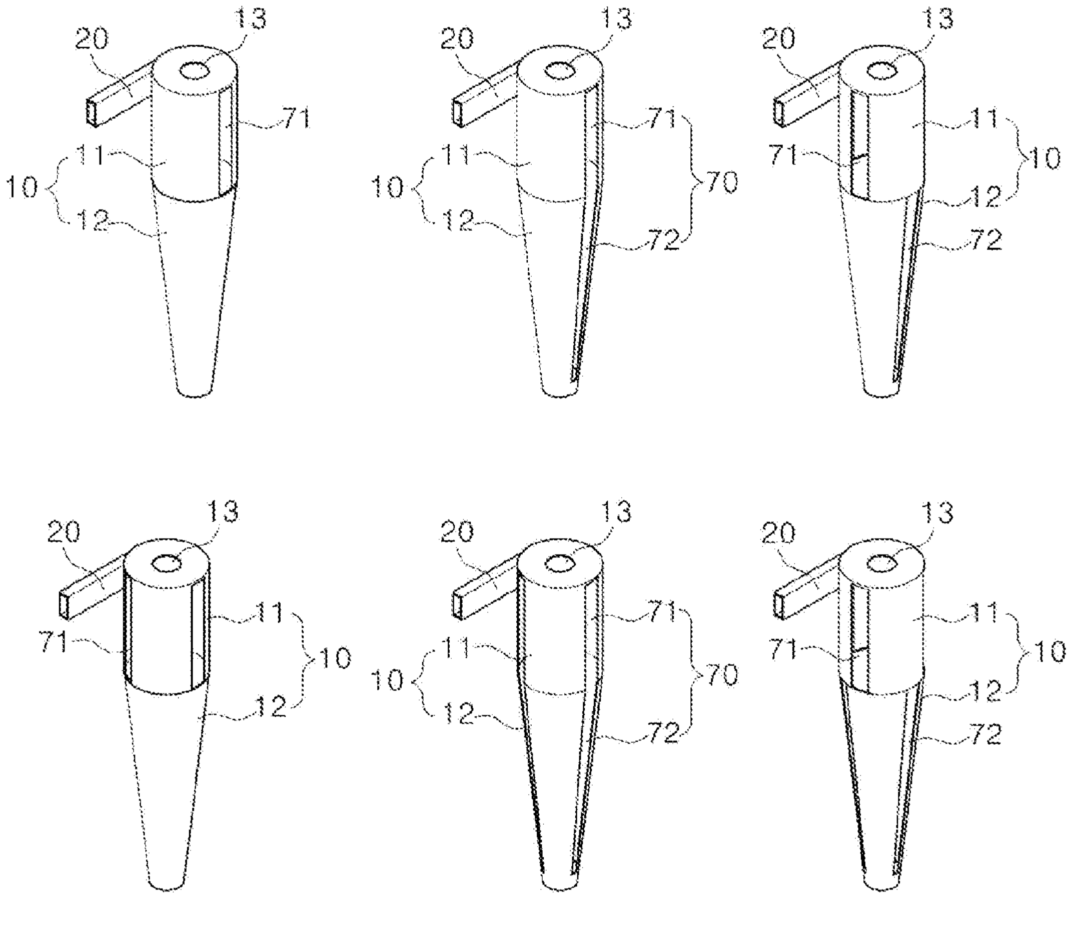
FIG. 9 is a perspective view illustrating various cut shapes of the first and second slit units applied in FIG. 3.
Figure 10:
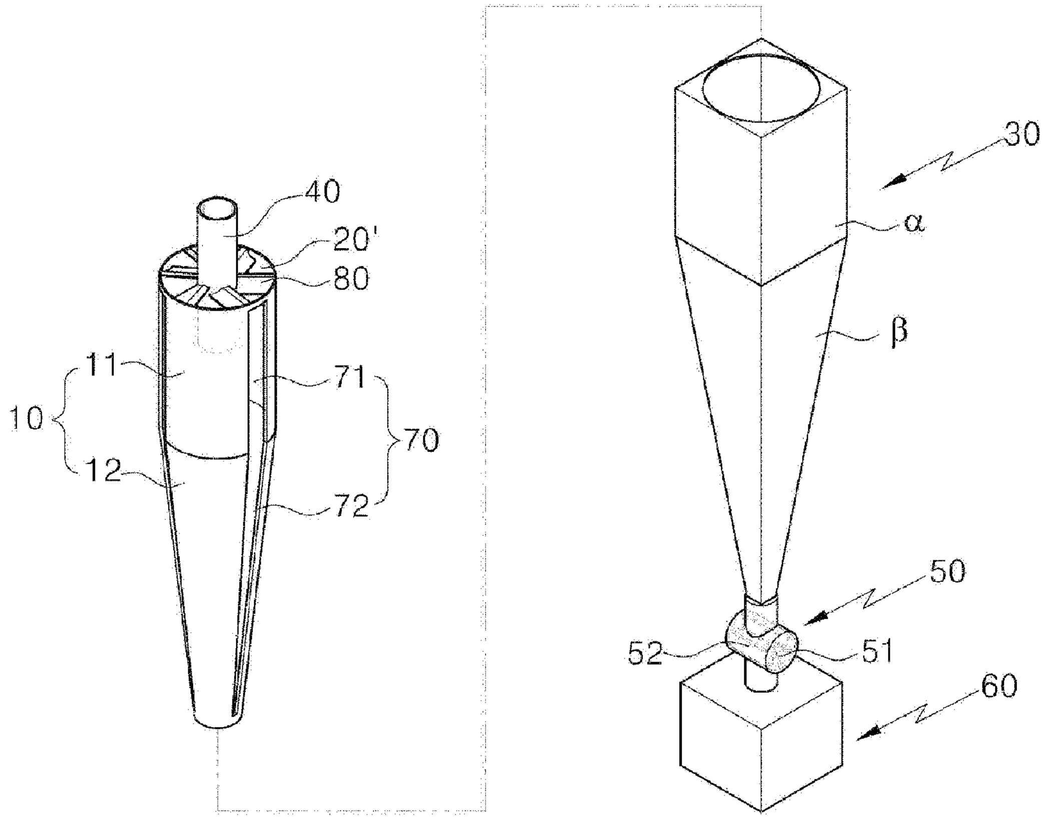
FIG. 10 is a disassembled perspective view of a dust collector according to the second embodiment of the present invention.
Figure 12:
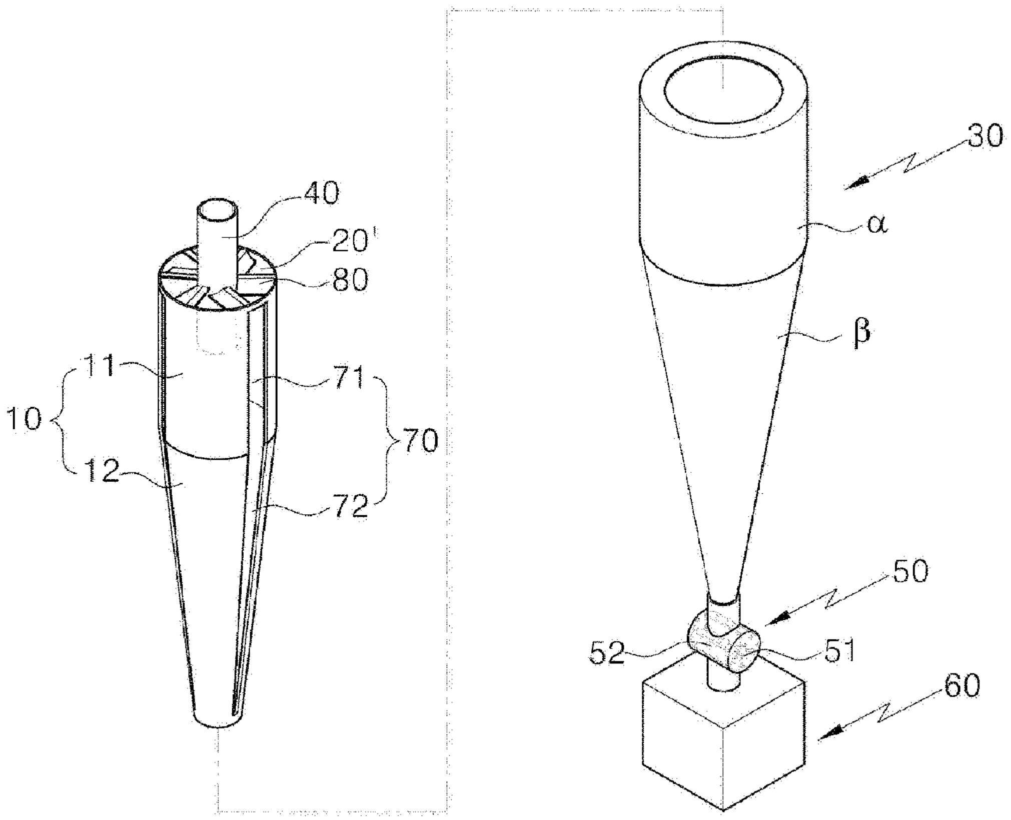
FIG. 12 is a disassembled perspective view of another embodiment of FIG. 10.
Figure 16:
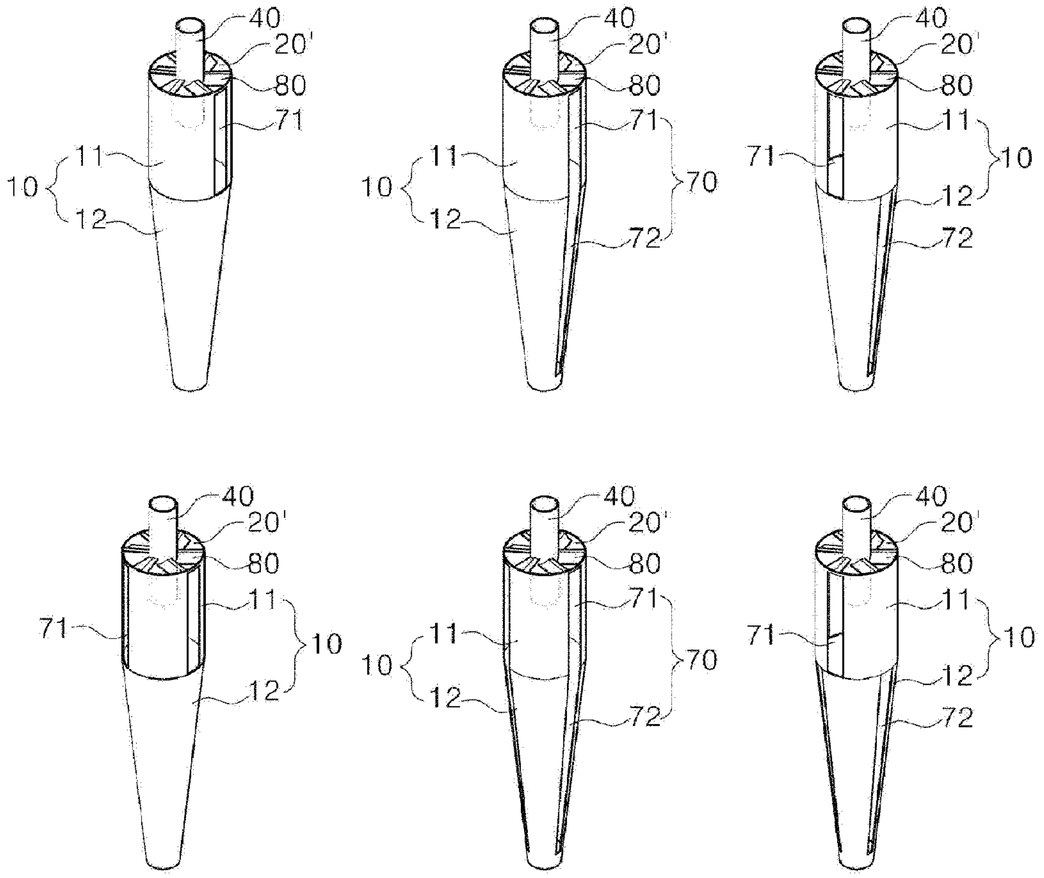
FIG. 16 is a perspective view illustrating various cut shapes of the first and second slit units applied in FIG. 10.
Figure 17:
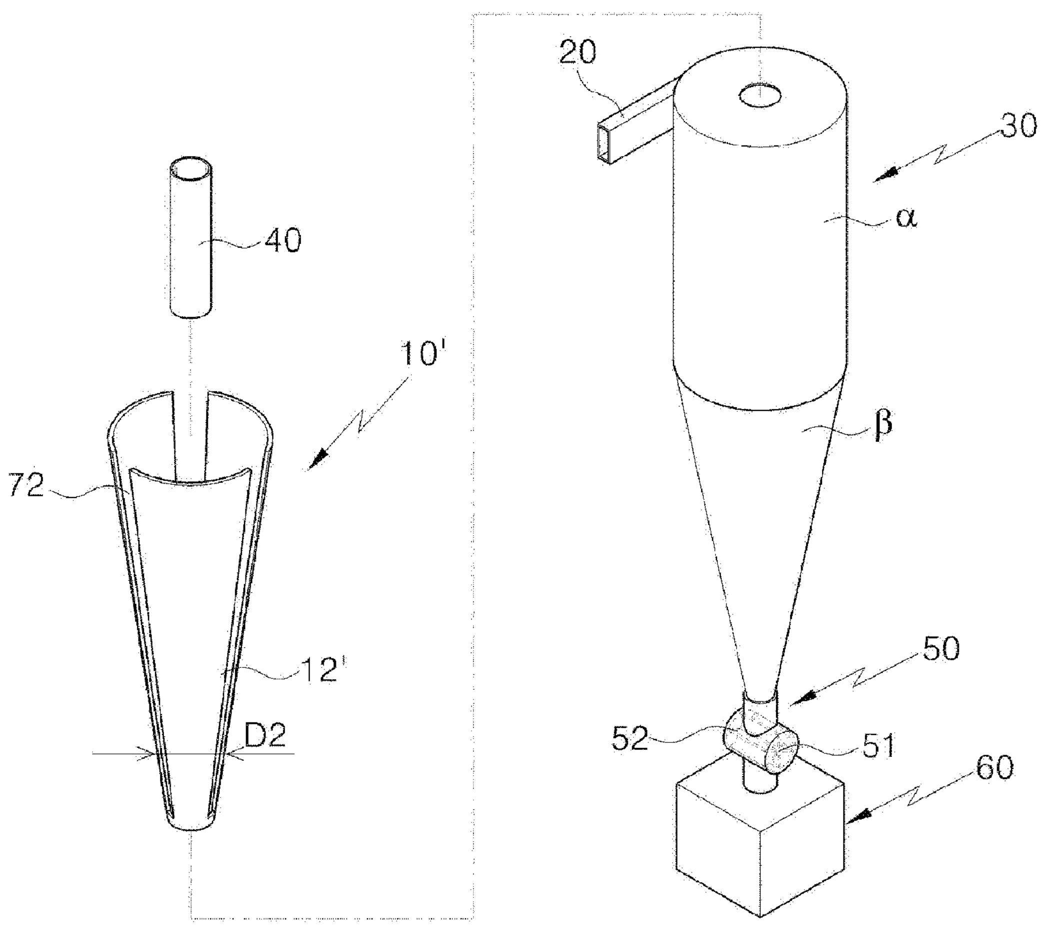
FIG. 17 is a disassembled perspective view of a dust collector according to the third embodiment of the present invention.

Further, the collector body (10) of the present invention in FIG. 3, FIG. 7, and FIG. 9 according to the first embodiment, and in FIG. 10, FIG. 12, and FIG. 16 according to the second embodiment is installed vertical to the ground surface and includes: a primary dust collecting unit (11); and a secondary dust collecting unit (12) extended from the lower end part of the primary dust collecting unit (11) and located under the primary dust collecting unit (11).

Further, the primary collecting unit (11) having a certain diameter (D1) is formed vacant in its inside and an upper side of the primary collecting unit (11) is closed and the lower end part of the primary collecting unit (11) is 12 open. An outlet hole (13) is perforated on the top of the primary collecting unit (11) to couple and communicate with the outlet (40) to be described. (Obviously, an top surface of the housing (30) encompassing the primary collecting unit (11) to be described must exist on a same horizontal plane and share with the top surface of the collector body (10). The outlet hole (13) formed on the top of the primary collecting unit (11) obviously must be formed commonly on the top surface of the housing (30).)

Upper and lower end parts of the secondary collecting unit (12) are open. The secondary collecting unit (12) is formed vacant in its inside and has conical shape with its diameter (D2) decreased gradually along a downward direction.

Further, the collector body (10) of the present invention as shown in FIG. 17 through FIG. 20 according to the third embodiment and in FIG. 21 through FIG. 24 according to the fourth embodiment, is installed inside of the collector housing (30) that is formed with an upper housing (α) and a lower housing (β). The collector body (10) may be formed with only the secondary collecting unit (12') different from the previously described collector body (10) formed with the primary collecting unit (11) and the secondary collecting unit (12). That is, one open end of the secondary collecting unit (12') is fixed at an inner circumference of the upper housing (α) of the collector housing (30) and the secondary collecting unit (12') is used by gradually decreasing the diameter (D2) along a downward lengthwise direction to be spaced apart with a certain gap from the inner surface of the lower housing (β).

The first slit unit (71) may be cut along a lengthwise direction on the wall surface of the primary collecting unit (11) as shown in FIG. 9 or FIG. 16. The first slit unit (71) may be formed with a single slit or a plurality of slits spaced apart equally over the whole lateral wall surface of the primary collecting unit (11).

The second slit unit (72) may be cut along a lengthwise direction on the wall surface of the secondary collecting unit (12, 12') as shown in FIGS. 9, 16, 17 and 21. Like the first slit unit (71), the second slit unit (72) may be formed with a single slit or a plurality of slits spaced apart equally over the whole wall surface of the secondary collecting unit (12, 12').

Further, the first slit unit (71) and the second slit unit (72) may be cut in an identical direction on the wall surfaces of the primary collecting unit (11) and the secondary collecting unit (12, 12') to form the slit unit (70) that connects the first slit unit (71) and the second slit unit (72) with each other, or may be cut in a direction on the primary collecting unit (11) different from a direction on the secondary collecting unit (12, 12').

While the first slit unit (71) may be formed with a single slit or a plurality of slits on the primary collecting unit (11), the second slit unit (72) may not be formed on the secondary collecting unit (12). On the contrary, while the second slit unit (72) may be formed with a single slit or a plurality of slits on the secondary collecting unit (12), the first slit unit (71) may not be formed on the primary collecting unit (11). Further, the first slit unit (71) and the second slit unit (72) may be formed respectively on the primary collecting unit (11) and the secondary collecting unit (12), or both of the first slit unit (71) and the second slit unit (72) may not be formed.

Figure 4:
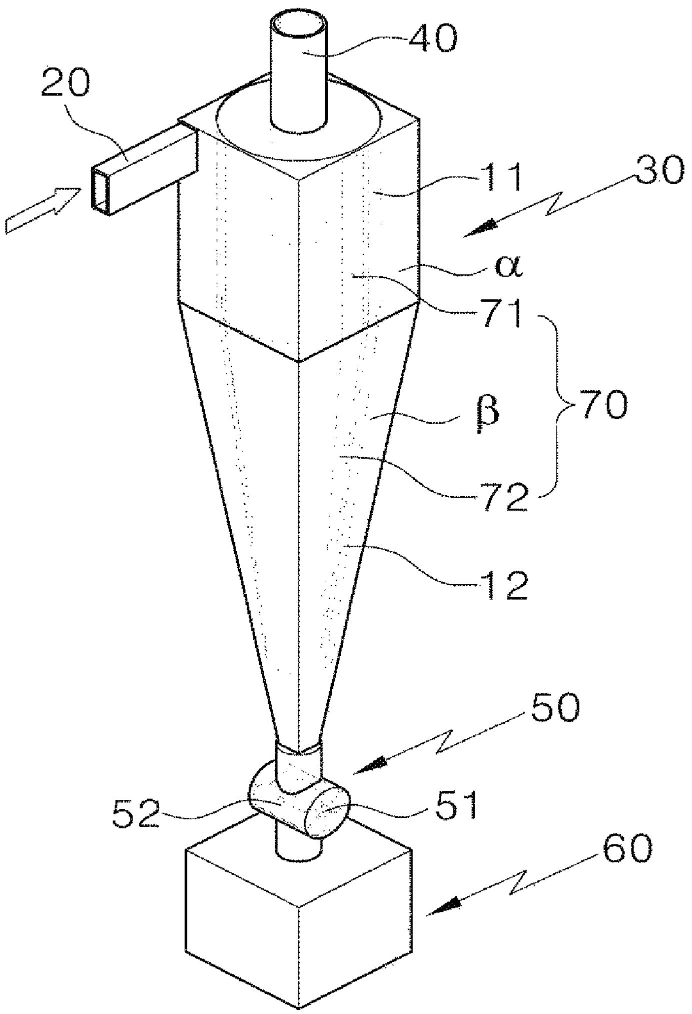
FIG. 4 is an assembled perspective view of FIG. 3.
Figure 5:
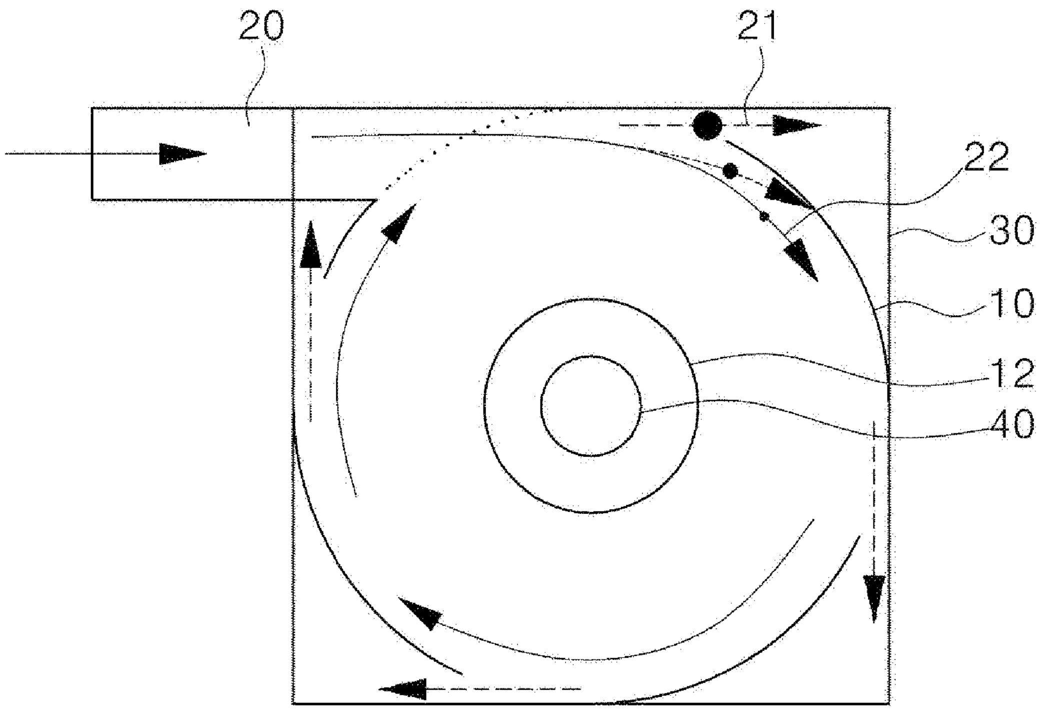
FIG. 5 is a view illustrating a concept of dust removal principle of FIG. 3.
Figure 6:
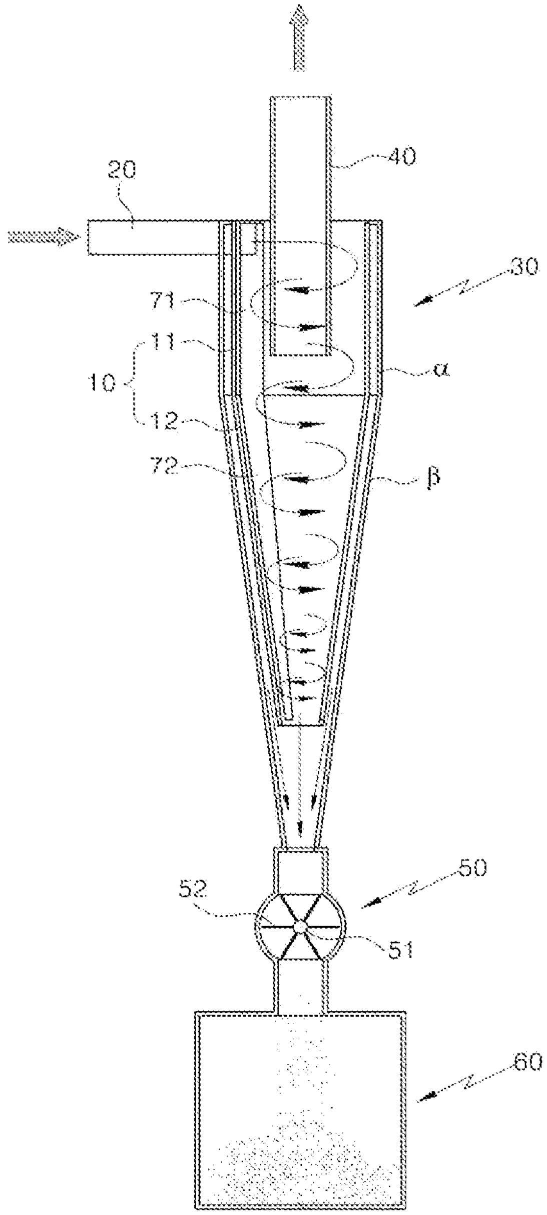
FIG. 6 is a view illustrating a front cross section of FIG. 3.
Figure 8:
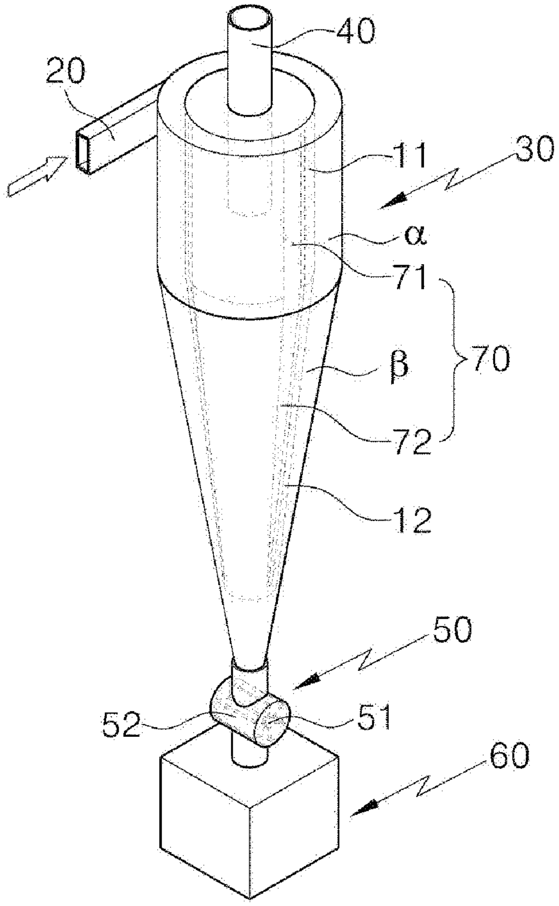
FIG. 8 is an assembled perspective view of FIG. 7.
Figure 11:
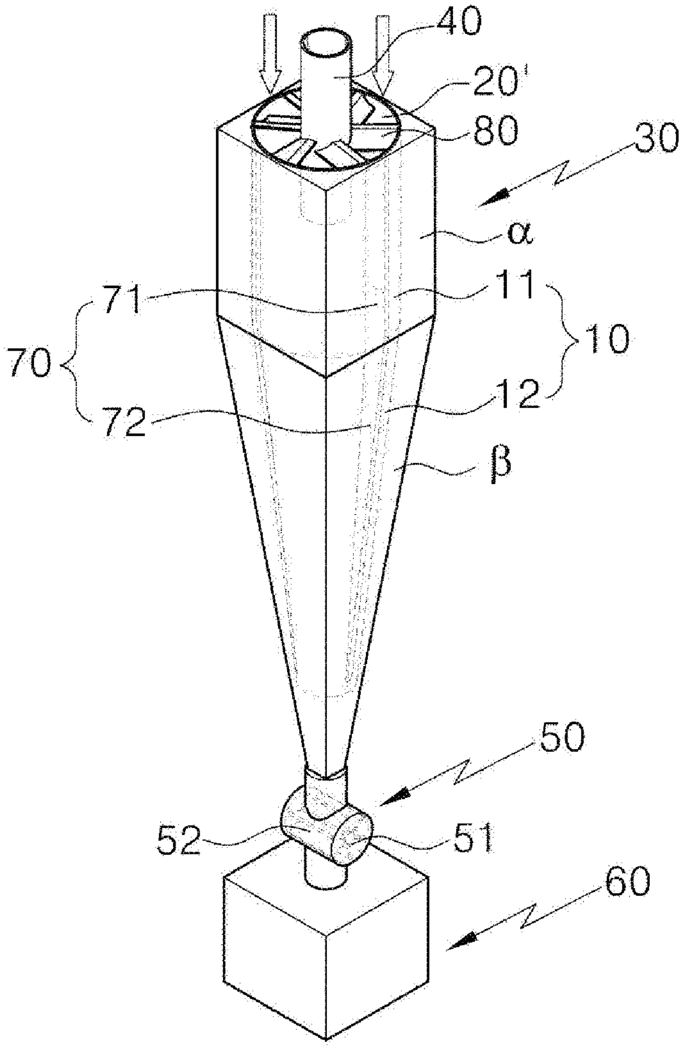
FIG. 11 is an assembled perspective view of FIG. 10.
Figure 13:
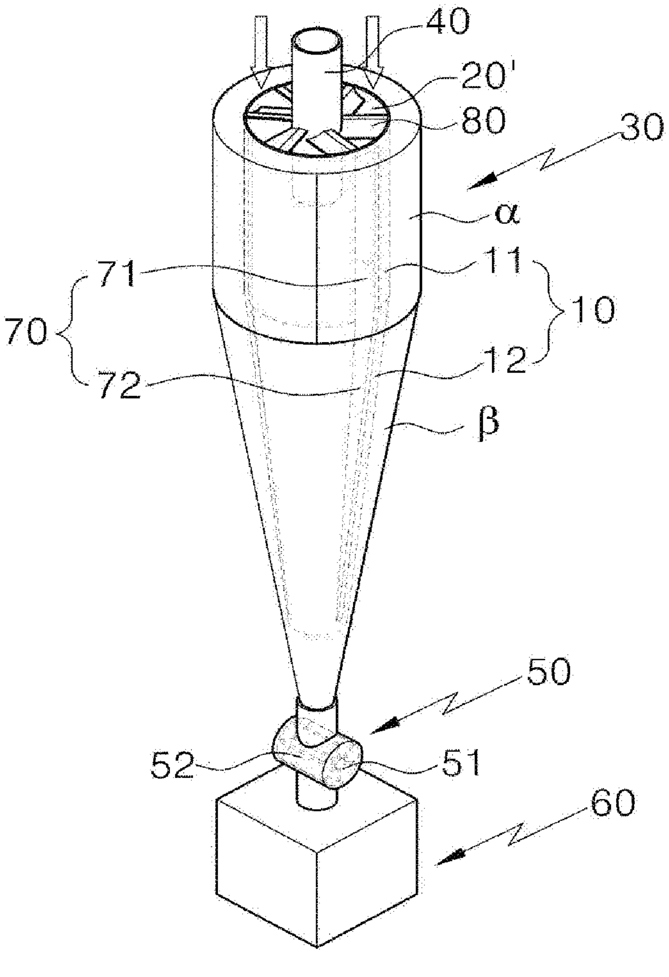
FIG. 13 is an assembled perspective view of FIG. 12.
Figure 14:
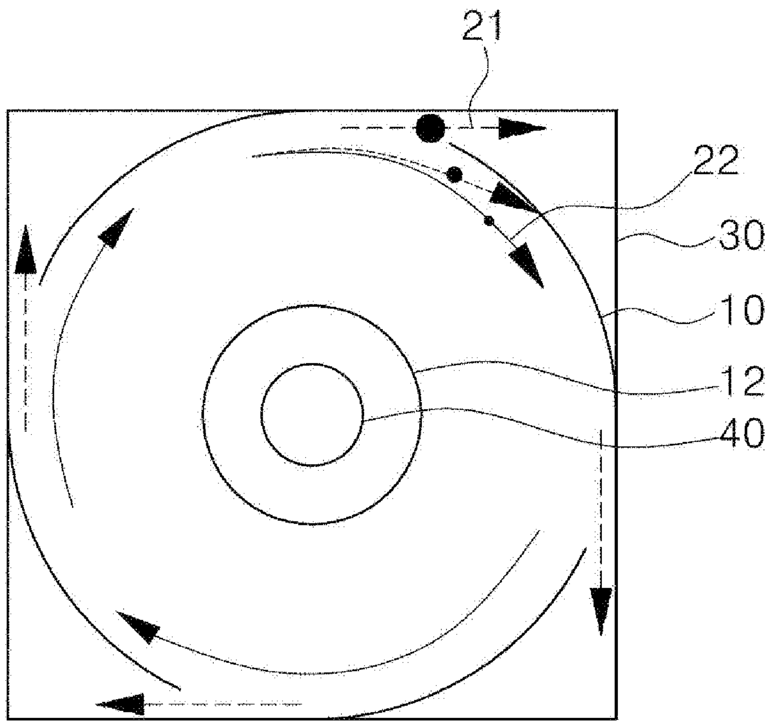
FIG. 14 is a view illustrating a concept of dust removal principle of FIG. 10.
Figure 15:
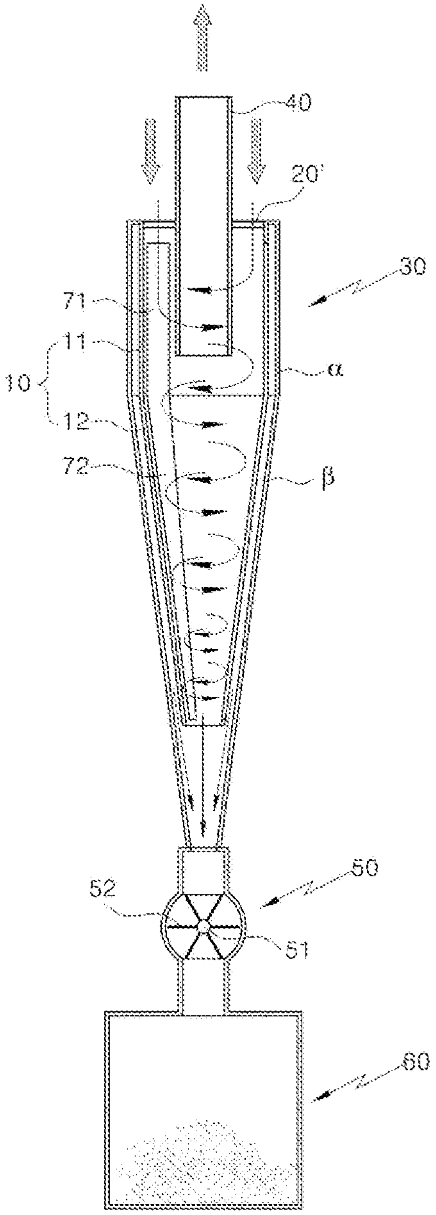
FIG. 15 is a view illustrating a front cross section of FIG. 10.
Figure 18:
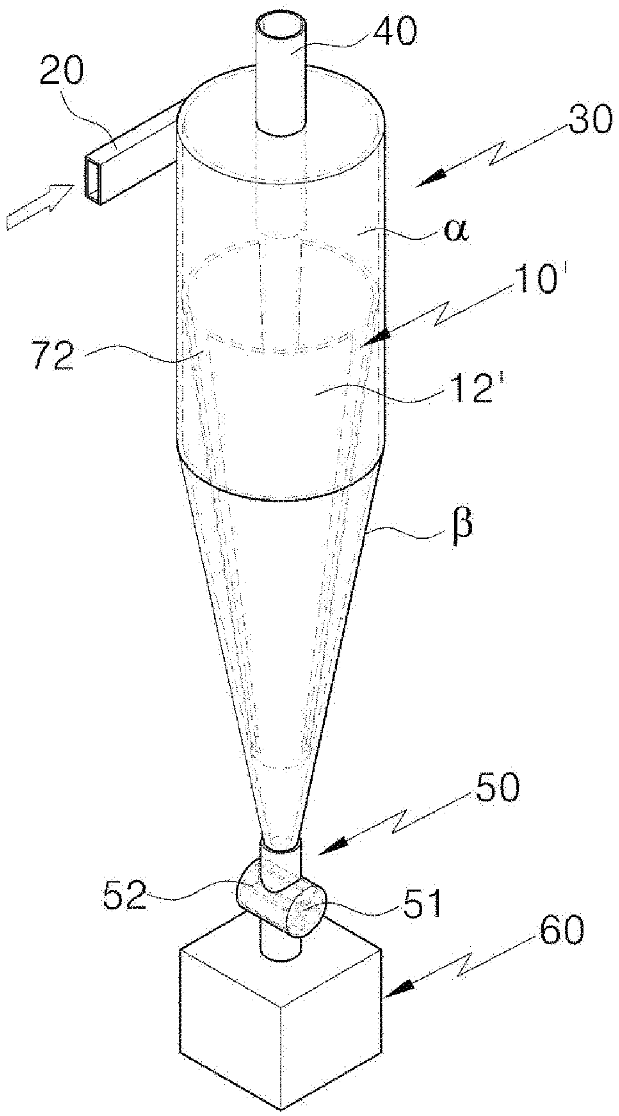
FIG. 18 is an assembled perspective view of FIG. 17.
Figure 19:
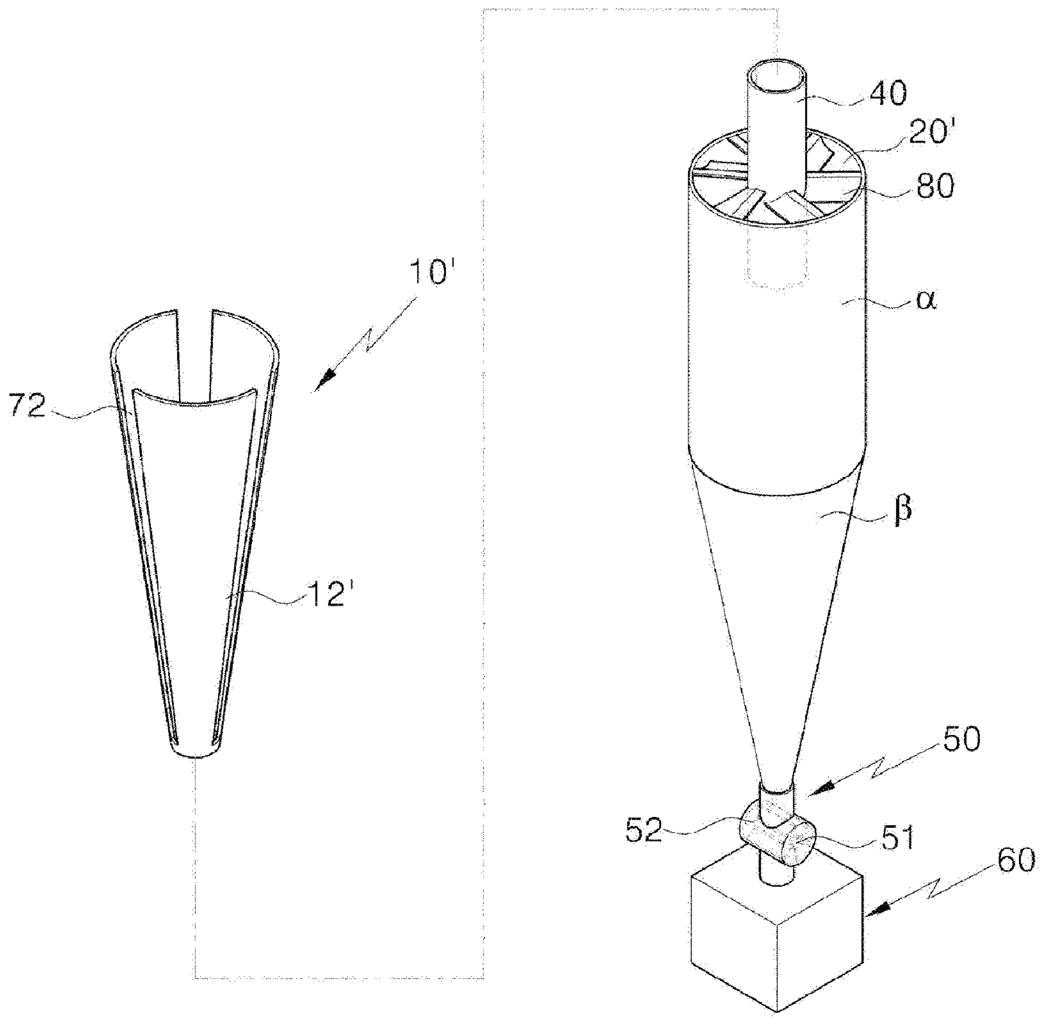
FIG. 19 is a disassembled perspective view of another embodiment of FIG. 17.
Figure 20:
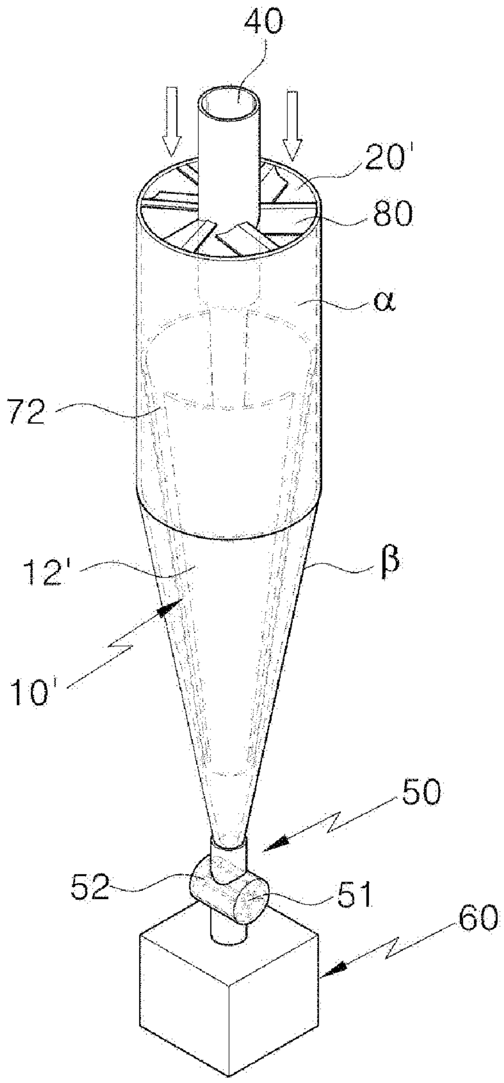
FIG. 20 is an assembled perspective view of FIG. 19.

The collector housing (30) of the present invention as shown in FIG. 4 and FIG. 8 according to the first embodiment, and in FIG. 11 and FIG. 13 according to the second embodiment installs the collector body (10) formed with the primary and secondary collecting units (11, 12) or the collector body (10') formed only with the secondary collecting unit (12') inside thereof. An outer circumferencial surface of the collector body (10) and an inner circumferencial surface of the collector housing (30) are spaced apart by a predetermined gap or in contact with each other, and the top surfaces of the collector housing (30) and the collector body (10) exist on the same plane. The collector housing (30) of the present invention as shown in FIG. 18 and FIG. 20 according to the third embodiment, and in FIG. 22 and FIG. 24 according to the fourth embodiment installs the collector body (10') having only a secondary dust collecting unit (12') inside thereof. An outer circumferencial surface of the collector body (10') and an inner circumferencial surface of the collector housing (30) are spaced apart by a predetermined gap. However, the upper end of the collector body (10') is fixed to an inner circumference at a certain height from the lower end of the upper housing (α) of the collector housing (30).

Further, a horizontal cross sectional circle inscribed in the collector housing (30) of the collector body (10) formed of the primary and secondary collecting units (11, 12) may have a diameter same or relatively larger than a horizontal cross sectional circle circumscribed on the collector body (10). The circle inscribed in the collector housing (30) may be formed of a shape same as the circle circumscribed on the collector body (10). Cross sections of the upper housing (α) and the lower housing (β) that respectively encompass the primary and secondary collecting unit (11, 12) may be formed identical or different from each other. A cross section of the collector housing (30) may be one of circular, oval, polygonal (quadrangle, triangle, etc.) cross sections, or a cross section of conical type with its diameter gradually deceased in the lengthwise direction. A horizontal cross sectional circle inscribed in the collector housing (30) of the collector body (10') formed of the secondary collecting units (12') only may have a diameter same or relatively larger than a horizontal cross sectional circle circumscribed on the collector body (10). A cross section of the lower housing (β) may be formed identical or different from a cross section of the secondary collecting unit (12').

The inlet (20) as shown in FIG. 3 through FIG. 9 according to the first embodiment flows the dirty gas emitted from dust generating sources (90) in a direction tangential to the primary collecting unit (11) and one side of the collector housing (30). The inlet (20) as shown in FIG. 17 through FIG. 20 according to the third embodiment flows the dirty gas emitted from dust generating sources (90) in a direction tangential to the upper housing (α) of the collector housing (30).

The collector body (10) is installed vertical to the ground and the inlet (20) flows the dirty gas horizontal to the ground installed with such collector body (10).

Figure 21:
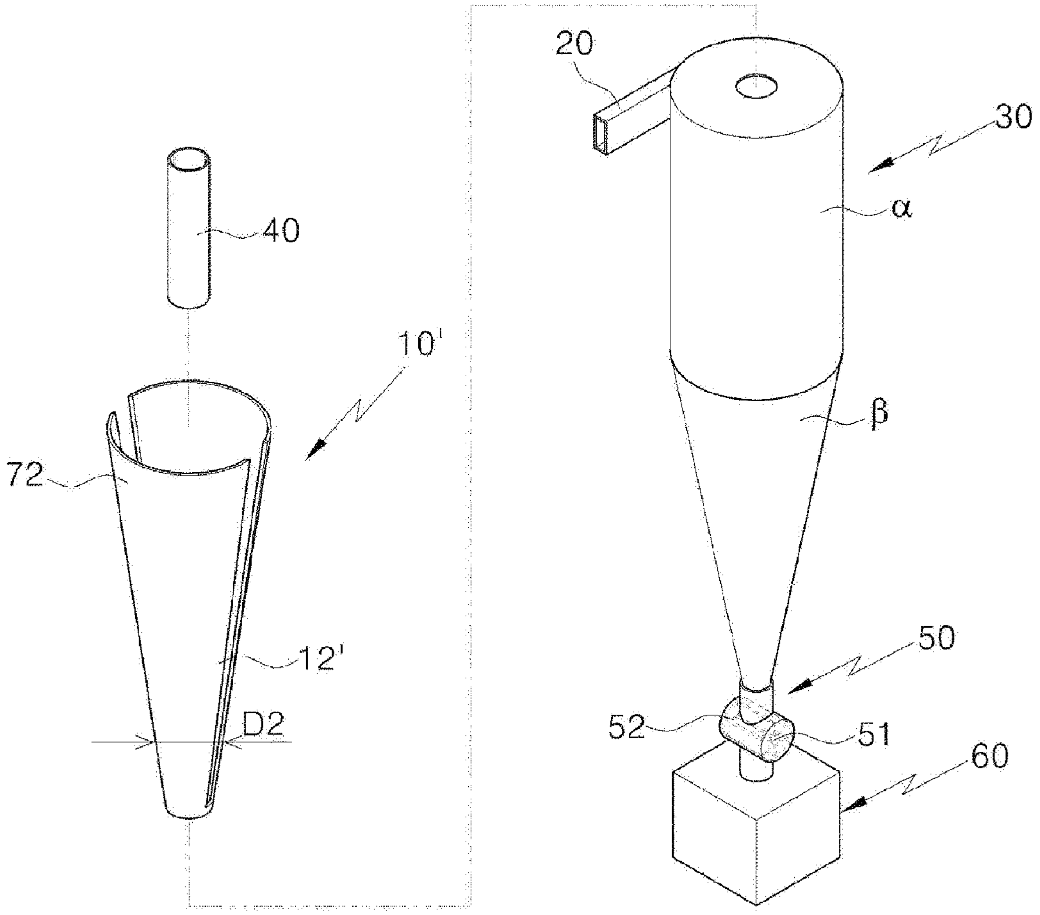
FIG. 21 is a disassembled perspective view of a dust collector according to the fourth embodiment of the present invention.
Figure 22:
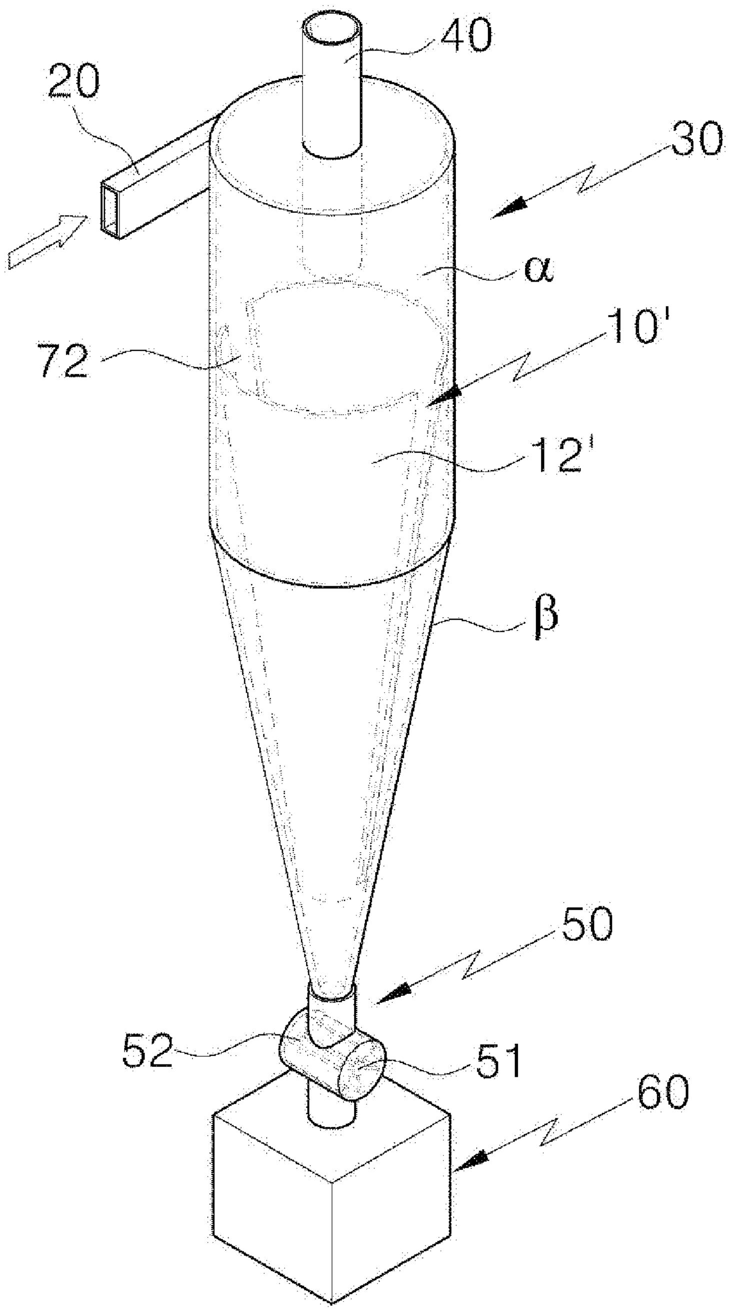
FIG. 22 is an assembled perspective view of FIG. 21.
Figure 23:
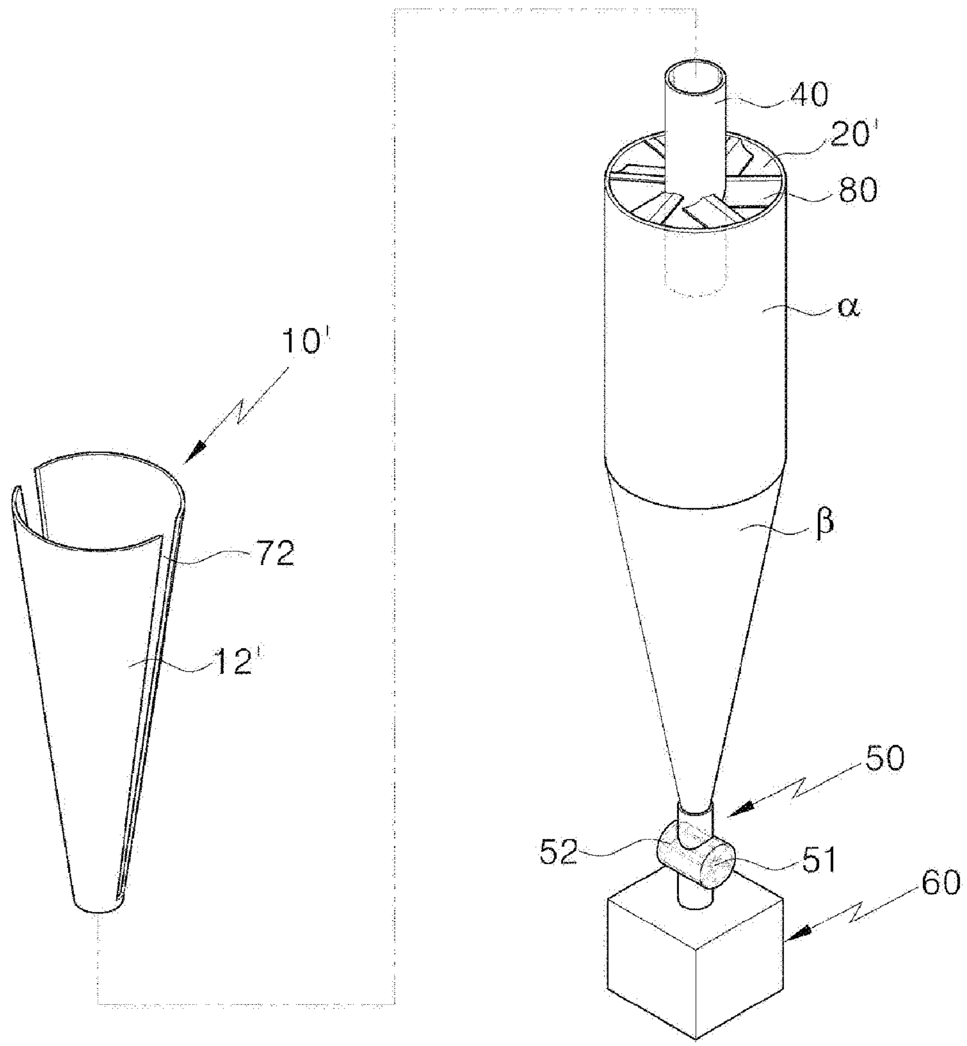
FIG. 23 is a disassembled perspective view of another embodiment of FIG. 21.
Figure 24:
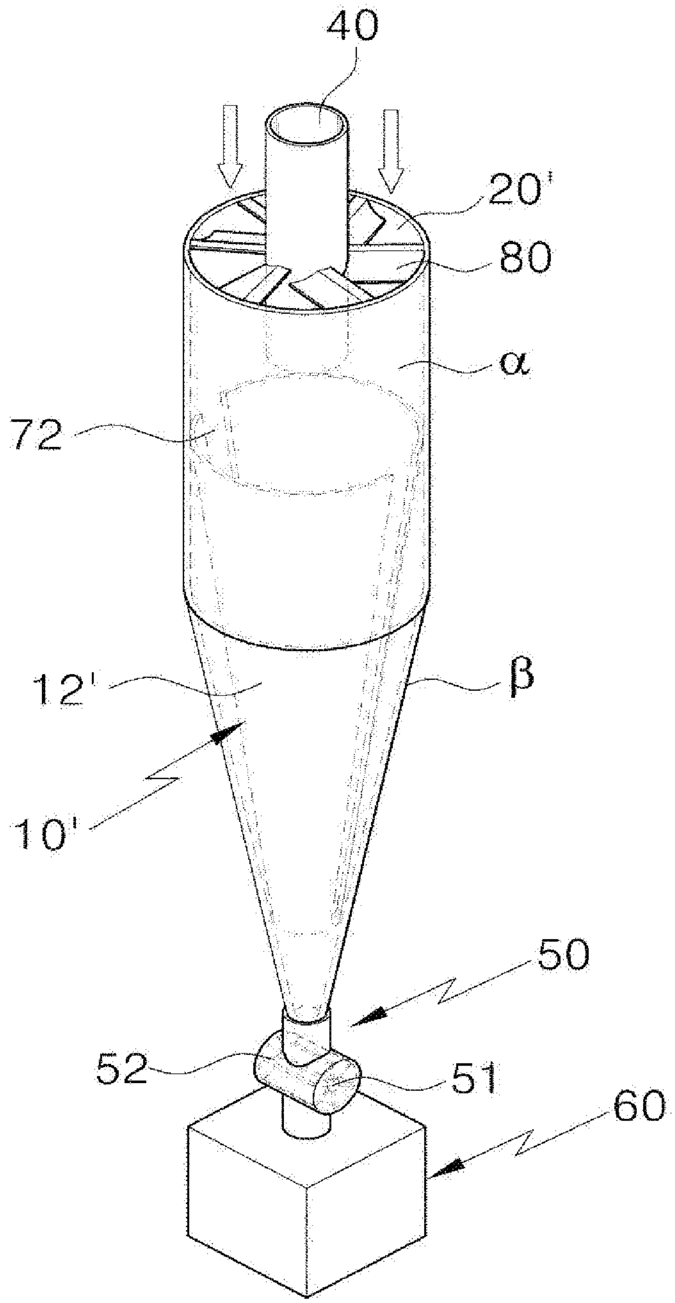
FIG. 24 is an assembled perspective view of FIG. 23.

In addition, as shown in FIG. 10 through FIG. 16 according to the second embodiment, the upper side of the primary collecting unit (11) is open and the inlet (20') is formed at the upper part of the primary collecting unit (11) by fixing and installing a plurality of guide vanes (80) that are spaced apart equally and inclined in one direction toward an inner circumference at the upper inside of the primary collecting unit (11) for the dirty gas to flow in an axial direction identical to the longitudinal axis of the dust collector of the present invention. As shown in FIG. 21 through FIG. 16 according to the fourth embodiment, the inlet (20') may fix and install a plurality of guide vanes (80) that are spaced apart equally and inclined in one direction toward an inner circumference at the upper inside of the upper housing (α) of the collector housing (30). Thus, the dirty gas flowing in axial flow type is applied with a centrifugal force by the guide vanes (80) to flow in rotational way inside the collector body automatically, thereby flowing in rotational way downward along a lengthwise direction of the collector body (10).

Obviously, the guide vanes (80) perform a role of guiding a flow direction of the dirty gas. For this purpose, a fan may be used to replace the guide vanes (80).

The outlet (40) is coupled to an upper surface of the collector housing (30) to communicate with the collector housing (30). As described previously, the inlet (40) is vertically coupled to the outlet hole (13) perforated at the top surface of the primary collecting unit (11) and the housing (30) (when the first collecting unit is provided) or at the upper surface of the housing (30) (when the first collecting unit is not provided). One end of the outlet (40) is inserted into the inside of the collector housing (30) by a certain length and the other end of the outlet (40) is protruded outwardly to exhaust the dirty gas removed of dust particles through an outlet duct (92) coupled and communicated with the protruded end of the outlet (40) using a fan (93).

The rotary valve (50) includes a shaft (51) rotating horizontally to the ground surface and a plurality of blades (52) protruded radially from an outer circumferencial surface of the shaft (51) to discharge the collected dust particles from the collector body (10) to the storage tank (60).

Hereinafter, an operation principle of the preferable embodiment of the present invention having the said configuration and structure will be described.

Figure 2:
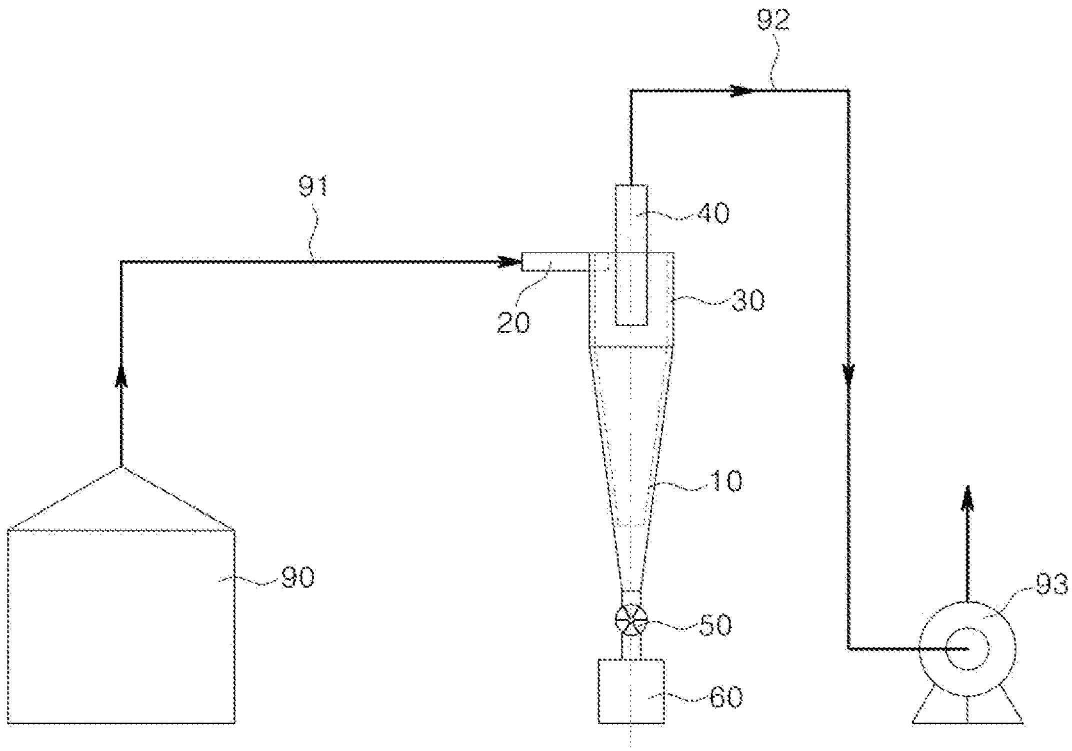
FIG. 2 is a view illustrating a concept of a dust collector according to the present invention.

As shown in FIG. 2, a dirty gas emitted in the dust particle generating source (90) (power plant, cement factory, large scale incineration plant, and boiler, etc.) flows into the primary collecting unit through the inlet (20, 20') of a cyclone dust collector of the present invention through an inlet duct (91). For example as in FIG. 5 or FIG. 14, dust particles of large inertial force floating in the dirty gas follow a trajectory (21) moving outward direction by a centrifugal force when the particles pass through the first slit unit (71) formed of single slit or plural slits on the lateral wall surface of the primary collecting unit (11), and flow between the primary collecting unit (11) and the housing (30). Then, after colliding with the inner circumferential surface of the housing (30), the dust particles fall down to be collected in the storage tank (60) through the rotary valve (50). (That is, due to the circular cross section of the primary collecting unit (11), the dust particles flowed in the primary collecting unit (11) along the direction tangential to the primary collecting unit (11) and the one side of the collector house (30) swirl continuously downward by the inertial force, and pass through the first slit unit (71) formed of single slit or plural slits on the outer circumferential surface of the primary collecting unit (11) and flow between the collector housing (30) and the primary collecting unit (11). Then, the dust particles collide with the inner circumferential surface of the collector housing (30) and fall down.)

In addition, dust particles of small inertial force in the dirty gas flowed in the primary collecting unit (11) through the inlet (20, 20') of the dust collector follow a trajectory (2) swirling downward in the lengthwise direction of the collector body (10) in the primary collecting unit (11) by a centrifugal force. Then, the dust particles are collected in the storage tank (60) through the rotary valve (50). (At this time, the dust particles which cannot escape outside through the first slit unit (71) of the primary collecting unit (11) continuously swirl downward to the secondary collecting unit (12). Then, similar to the various embodiments of the present invention, the dust particles flow between the secondary collecting unit (12) and the housing (30) through the second slit unit (72) formed of single slit or plural slits on the secondary collecting unit (12). The escaped dust particles collide with an inner circumferential surface of the housing (30) and fall down.) In other words, the dust particles of large inertial force may be passed through slits only on the primary collecting unit (11) or only on the secondary collecting unit (12) and finally removed by impaction onto the inner circumferential surface of the housing (30). Further, the dust particles of large inertial force may be passed through slits on both of the primary collecting unit (11) and the secondary collecting unit (12) over the whole length of the collector body (10), and finally collide with the inner circumferential surface of the housing (30) and fall down.

Further, when the dirty gas flows in an axial direction identical to the longitudinal axis of the collector body (10), the inlet (20') is formed for the dirty gas to swirl by the guide vanes (80) formed on the inner circumferential surface at the upper inside of the primary collecting unit (11) (for using a centrifugal force).

Figure 25:
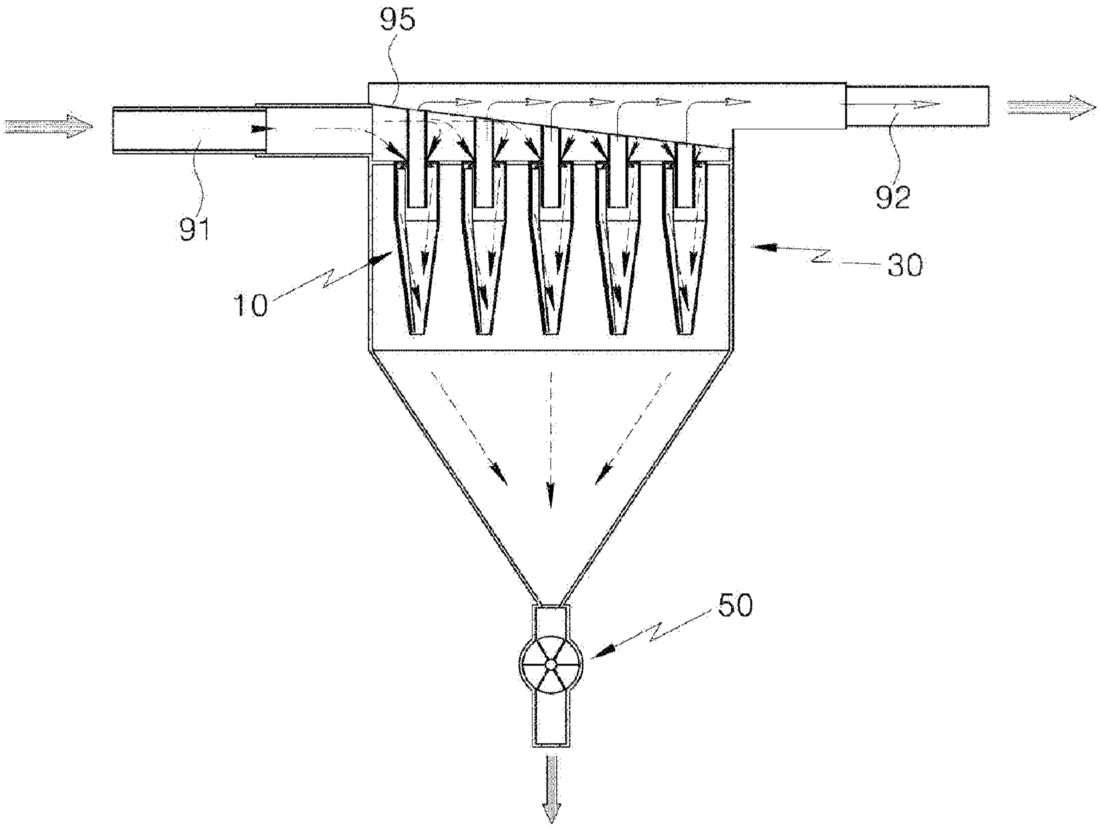
FIG. 25 is a front cross section view illustrating an application of using a plurality of collecting bodies according to one embodiment of the present invention.
Figure 26:
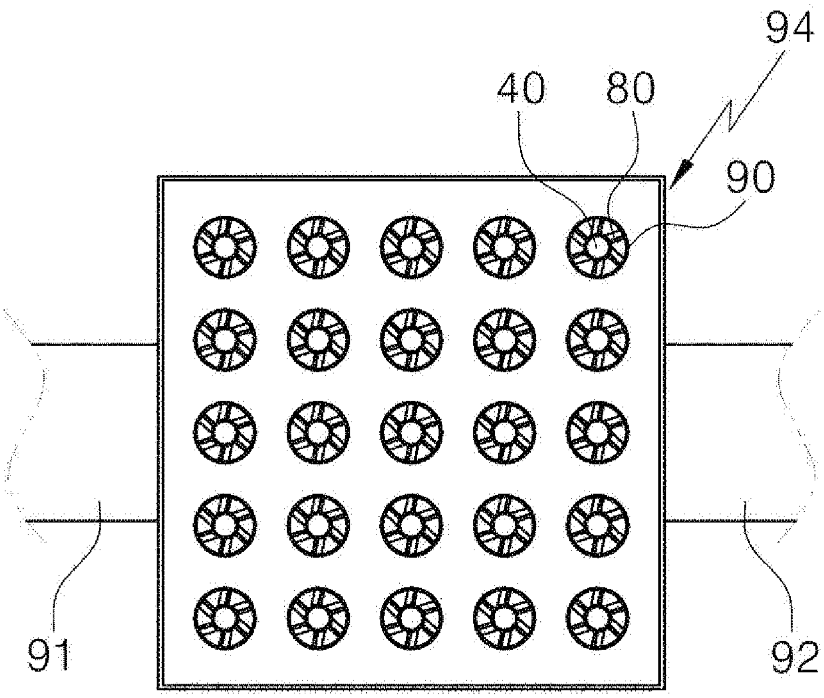
FIG. 26 is a plane cross section view of FIG. 25.

Further, as the diameter of the collector body (10) increases, the rotating velocity is decreased and the collection efficiency of a cyclone is reduced. Thus, the present invention as shown in FIG. 25 and FIG. 26 installs a plurality of the collecting bodies (10) with their diameter relatively smaller than the collector body (10) used soley. The plurality of the collecting bodies (10) of smaller diameter are spaced apart in equal interval to increase a processing capacity. For this purpose, a top plenum (94) is an upper part of the housing (30) to seal the housing (30), and one side of the top plenum (94) is coupled to an inlet duct (91) connected to the particle generating source (90) and the other side of the top plenum (94) is coupled to an outlet duct (92) for exhausting the treated gas removed of dust particles.

Further, the top plenum (94) is provided with a distributing plate (95) which is inclined downward from the inlet duct (91) toward the outlet duct (92). The distributing plate (95) divides inside of the top plenum (94) into an upper part(A) and a lower part(B). The plurality of the outlets (40) coupled with the plurality of the collecting bodies(10) are connected to the distributing plate (95). Obviously, a perforated coupling hole (96) has to be formed separated in equal interval on the distributing plate (95). (That is, as shown in FIG. 25, since the distributing plate is inclined and the whole length of the plurality of the outlets becomes shorter as the outlets get close to the side of the outlet duct (92), the outlets (40) have their lengths obviously different from each other. Further, in order to flow in the dirty gas, a coupling position of the outlet duct (92) must be relatively higher than a coupling position of the inlet duct (91).

Accordingly, the dirty gas from the inlet duct (91) flows in the lower part (B) of the top plenum (94) beneth the distributing plate (95) to flow into the inlet (20') of the plurality of collector body (10). Then, the treated gas removed of dust particles flows through the outlets (40) to the upper part (A) of the top plenum (94) above the distributing plate (95) to be exhausted outside through the outlet duct (92) coupled to one side of the top plenum (94).

Though the present invention is described by the limited exemplary embodiments and drawings as above, the present invention is not limited to the exemplary embodiments and drawings but will be understood by those of ordinary skill in the art that various changes in form and details may be made therein without departing from the spirit and scope of the present invention as defined by the following claims or their equivalents.

What is claim is:

1. A cyclone dust collector removing dust particles in dirty gas emitted from dust generating sources, the cyclone dust collector comprising:

a collector body including a primary dust collecting unit having a diameter (D1), and a secondary dust collecting unit extended from a lower end part of the primary dust collecting unit to communicate with the primary dust collecting unit, wherein a diameter (D2) of the secondary dust collecting unit is gradually decreasing along a downward direction;

an inlet to flow the dirty gas in a direction tangential to the primary dust collecting unit;

a collector housing installing the collector body inside thereof to be spaced apart by a certain predetermined gap or to be in contact with the collector housing;

an outlet inserted into an upper part of the collector housing and the primary dust collecting unit by a certain depth to communicate with the collector housing and the primary dust collecting unit for exhausting gas removed of dust particles;

a rotary valve coupled to a lower end part of the collector housing; and a storage tank coupled to a lower end of the rotary valve to store the dust particles removed in the collector housing.

2. A cyclone dust collector removing dust particles in dirty gas emitted from dust generating sources, the cyclone dust collector comprising:

a collector body including a primary dust collecting unit having a certain diameter (D1) and having an opening in an upper side thereof, and a secondary dust collecting unit extended from a lower end part of the primary dust collecting unit to communicate with the primary dust collecting unit, wherein a diameter (D2) of the secondary dust collecting unit is gradually decreasing along a downward direction;

an inlet forming a plurality of guide vanes which are installed in equal interval at an upper inside of the primary dust collecting unit and inclined toward one direction to swirl the dirty gas vertically;

a collector housing installing the collector body inside thereof to be spaced apart by a certain predetermined gap or to be in contact with the collector housing;

an outlet inserted into an upper part of the collector housing and the primary dust collecting unit by a certain depth to communicate with the collector housing and the primary dust collecting unit for exhausting gas removed of dust particles;

a rotary valve coupled to a lower end part of the collector housing; and a storage tank coupled to a lower end of the rotary valve to store the dust particles removed in the collector housing.

3. A cyclone dust collector removing dust particles in dirty gas emitted from dust generating sources, the cyclone dust collector comprising:

a collector housing formed of an upper housing (α) of cylindrical shape having a certain diameter and a lower housing (β) of conical shape extended from a lower end of the upper housing (α) to communicate with the upper housing (α);

an inlet to flow the dirty gas in a direction tangential to the upper housing (α) of the collector housing;

a collector body including a secondary dust collecting unit fixed at a certain height from the lower end of the upper housing (α) of the collector housing to communicate with the upper housing (α), wherein a diameter (D2) of the secondary dust collecting unit is gradually decreasing along a downward direction to maintain a certain gap between the secondary dust collecting unit and the lower housing (β) of the collector housing;

an outlet inserted into an upper part of the upper housing (a) of the collector housing by a certain depth to communicate with the collector housing for exhausting gas removed of dust particles;

a rotary valve coupled to a lower end part of the collector housing; and a storage tank coupled to a lower end of the rotary valve to store the dust particles removed in the collector housing.

4. A cyclone dust collector removing dust particles in dirty gas emitted from dust generating sources, the cyclone dust collector comprising:

a collector housing formed of, an upper housing (α) of a cylindrical shape having a certain diameter and having an opening in an upper side thereof and a lower housing (β) of a conical shape extended from a lower end of the upper housing (α) to communicate with the upper housing (α);

an inlet forming a plurality of vanes which are installed in equal interval at an upper inside of the upper housing (α) and inclined toward one direction to swirl the dirty gas vertically;

a collector body including a secondary dust collecting unit fixed at a certain height from the lower end of the upper housing (α) of the collector housing to communicate with the upper housing (α), wherein a diameter (D2) of the secondary dust collecting unit is gradually decreasing along a downward direction to maintain a certain gap between the secondary dust collecting unit and the lower housing (β) of the collector housing;

an outlet inserted into an upper part of the upper housing (α) of the collector housing by a certain depth to communicate with the collector housing for exhausting the gas removed of dust particles;

a rotary valve coupled to a lower end part of the collector housing; and a storage tank coupled to a lower end of the rotary valve to store the dust particles removed in the collector housing.

5. The cyclone dust collector according to claim 1, wherein the primary dust collecting unit forms a first slit unit with a single slit or a plurality of slits on a wall surface thereof cut along a lengthwise direction.

6. The cyclone dust collector according to claim 1, wherein the secondary dust collecting unit forms a second slit unit with a single slit or a plurality of slits on a wall surface thereof cut along a lengthwise direction.

7. The cyclone dust collector according to claim 1, wherein each of the primary dust collecting unit and the secondary dust collecting unit respectively forms a first slit unit formed with a single slit or a plurality of slits and a second slit unit formed with a single slit or a plurality of slits on wall surfaces of the primary dust collecting unit and the secondary dust collecting unit cut along lengthwise directions.

8. The cyclone dust collector according to claim 7, wherein the first slit unit and the second slit unit are cut in a same direction to be aligned with each other and formed an integral slit unit.

9. The cyclone dust collector according to claim 7, wherein the first slit unit and the second slit unit are cut in different directions not to be aligned with each other.

10. The cyclone dust collector according to claim 1, wherein the collector housing has a cross section selected from one of circular, oval and polygonal cross sections.

11. The cyclone dust collector according to claim 1, wherein the collector housing comprises an upper housing (α) and a lower housing (β) that encompass the primary dust collecting unit and the secondary dust collecting unit, wherein a cross section of the upper housing (α) is different from or identical with a cross section of the lower housing (β).

12. The cyclone dust collector according to claim 1, wherein the collector housing has a diameter relatively larger than the collector body, wherein the collector housing has a shape identical with or different from a shape of the collector body.

13. The cyclone dust collector according to claim 1, wherein among the dust particles flowed into the primary dust collecting unit or an upper housing (α) of the collector housing through the inlet, dust particles of large inertial force pass a first slit unit or a second slit unit cut on a wall surface of the collector body, and are removed through a space between the collector body and the collector housing by inertial force, and finally fall into the storage tank; and particles of relatively small inertial force flow like a vortex in the collector body by centrifugal force and finally fall into the storage tank.

14. The cyclone dust collector according to claim 3, wherein among the dust particles flowed in to the upper housing (α) of the collector housing through the inlet, dust particles of large inertial force pass a second slit unit cut on the wall surface of the collector body, and are removed through a space between the collector body and the collector housing by inertial force, and finally fall into the storage tank; and particles of relatively small inertial force flow like a vortex in the collector body by centrifugal force and finally fall into the storage tank.

15. The cyclone dust collector according to claim 2, wherein the plurality of the guide vanes are replaceable by a fan.

16. The cyclone dust collector according to claim 2 further comprising a plurality of collecting bodies installed inside of the collector housing, wherein a diameter of each of the plurality of collecting bodies is smaller than a diameter of the collector body, thereby improving a dust collecting efficiency through increasing a rotational flow velocity of the dust particles.

17. The cyclone dust collector according to claim 16 further comprising:

a top plenum sealing an upper portion of the housing, wherein two opposite sides of the top plenum are respectively connected to an inlet duct and an outlet duct to communicate the inlet duct and the outlet duct, and further the top plenum includes a distributing plate dividing an inside space of the top plenum into an upper part (A) and a lower part (B) and being inclined downward from the inlet duct toward the outlet duct, thereby introducing the dirty gas through the inlet duct connected to one side of the distributing plate and exhausting treated gas removed of dust particles through a plurality of outlets whose upper ends are connected to the distributing plate and then through the outlet duct connected to another side of the distributing plate.

18. The cyclone dust collector according to claim 2, wherein the primary dust collecting unit forms a first slit unit with a single slit or a plurality of slits on a wall surface thereof cut along a lengthwise direction.

19. The cyclone dust collector according to claim 2, wherein the secondary dust collecting unit forms a second slit unit with a single slit or a plurality of slits on a wall surface thereof cut along a lengthwise direction.

20. The cyclone dust collector according to claim 2, wherein each of the primary dust collecting unit and the secondary dust collecting unit respectively forms a first slit unit formed with a single slit or a plurality of slits and a second slit unit formed with a single slit or a plurality of slits on wall surfaces of the primary dust collecting unit and the secondary dust collecting unit cut along lengthwise directions.

* * * * *